United States Patent
Bourguignon et al.

(10) Patent No.: US 9,760,892 B2
(45) Date of Patent: Sep. 12, 2017

(54) METHOD AND SYSTEM FOR PROVIDING ASSISTANCE VIA VIDEO

(75) Inventors: Lindsay Bourguignon, Bellevue, WA (US); Eric Jensen, Bellevue, WA (US); Kristina Mashek, Bellevue, WA (US); John Morrison, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 1341 days.

(21) Appl. No.: 12/250,428

(22) Filed: Oct. 13, 2008

(65) Prior Publication Data

US 2009/0153646 A1 Jun. 18, 2009

Related U.S. Application Data

(60) Provisional application No. 60/986,593, filed on Nov. 8, 2007, provisional application No. 61/002,653, filed on Nov. 8, 2007.

(51) Int. Cl.
| | |
|---|---|
| *H04N 7/14* | (2006.01) |
| *G06Q 30/02* | (2012.01) |
| *H04M 3/51* | (2006.01) |
| *H04M 3/523* | (2006.01) |

(52) U.S. Cl.
CPC .......... *G06Q 30/02* (2013.01); *H04M 3/51* (2013.01); *H04M 3/5233* (2013.01); *H04M 2203/251* (2013.01); *H04M 2203/257* (2013.01)

(58) Field of Classification Search
USPC ...... 348/14.01, 14.1, 14.11, E7.081, E7.082; 379/88.13, 93.21, 158, 205.01
See application file for complete search history.

(56) References Cited

U.S. PATENT DOCUMENTS

| | | | |
|---|---|---|---|
| 6,330,243 B1 | 12/2001 | Strandberg | |
| 6,404,747 B1 | 6/2002 | Berry et al. | |
| 6,671,262 B1 | 12/2003 | Kung et al. | |
| 6,816,469 B1 | 11/2004 | Kung et al. | |
| 7,330,873 B2* | 2/2008 | Yoshida | G06F 17/30873 |
| | | | 707/E17.111 |

(Continued)

FOREIGN PATENT DOCUMENTS

EP 0 821 510 1/1998

OTHER PUBLICATIONS

International Search Report and Written Opinion dated Nov. 3, 2008 for PCT/US08/83058.

(Continued)

*Primary Examiner* — Yosef K Laekemariam
(74) *Attorney, Agent, or Firm* — Lee & Hayes, PLLC

(57) ABSTRACT

A system, device, and method for providing assistance to a user may include initiation of a video and/or text chat session as an audio telephone call between a terminal operated by the user and a call host, establishment, by the call host, of an audio connection between the user terminal and call host for the audio telephone call, a routing, by the call host, of the audio telephone call to a terminal of a human agent, the routing depending on a type of assistance requested by the user, and the user terminal and the agent terminal establishing a video connection and/or a text chat connection between the user terminal and the agent terminal after the audio telephone call is accepted by the agent terminal.

33 Claims, 11 Drawing Sheets

(56) References Cited

U.S. PATENT DOCUMENTS

| | | | |
|---|---|---|---|
| 8,587,659 B1* | 11/2013 | Socolinsky | H04N 5/23293 318/47 |
| 2002/0140741 A1 | 10/2002 | Felkey et al. | |
| 2004/0017388 A1 | 1/2004 | Stautner et al. | |
| 2005/0114504 A1* | 5/2005 | Marolia | H04M 1/24 709/224 |
| 2006/0031291 A1 | 2/2006 | Beckemeyer | |
| 2007/0147597 A1* | 6/2007 | Bangor et al. | 379/207.02 |
| 2007/0185957 A1 | 8/2007 | Mandalia et al. | |
| 2008/0015881 A1* | 1/2008 | Shankar | G06Q 30/016 455/556.1 |

OTHER PUBLICATIONS

European Search Report dated Jan. 7, 2013, for European Patent Application No. 08847845.8.

* cited by examiner

```
|1|2|3|4|5|6|                CALL VECTOR
     Number: 650          Name: Video DN Adj
 Multimedia? n           Attendant Vectoring? n    Meet-me Conf? n              Lock? n
    Basic? y        EAS? y        G3U4 Enhanced? y      ANI/II-Digits? y    ASAI Routing? y
 Prompting? y       LAI? y        G3U4 Adv Route ? y        CINFO? y BSR? y     Holidays? y
 Variables? y      3.0 Enhanced? y
01
02
03  wait-time     1 secs hearing silence
04
05
06  adjunct       routing link 7
07  wait-time     3 secs hearing i-silent
08  adjunct       routing link 1
09  wait-time     3 secs hearing i-silent
10  route-to      number V1              with cov n if unconditionally
11  stop
12
```

| 1 | 2 | 3 | 4 | 5 | 6 |

CALL VECTOR

Number: 651          Name: Video TranRoute
Multimedia? n          Attendant Vectoring? n     Meet-me Conf? n          Lock? n
    Basic? y            G3U4 Enhanced? y          ANI/II-Digits? y     ASAI Routing? y
Prompting? y   EAS? y   G3U4 Adv Route ? y        CINFO? y  BSR? y       Holidays? y
Variables? y   LAI? y  3.0 Enhanced? y 01 wait-time  0 secs hearing i-silent
02 route-to   number V1          with cov n if unconditionally
03 stop
04
05
06
07
08
09
10
11
12

```
| 1 | 2 | 3 | 4 | 5 | 6 |                    CALL VECTOR

Number: 652              Name: Video Adj Land
 Multimedia? n              Attendant Vectoring? n      Meet-me Conf? n              Lock? n
     Basic? y       EAS? y       G3U4 Enhanced? y         ANI/II-Digits? y     ASAI Routing? y
 Prompting? y       LAI? y       G3U4 Adv Route ? y          CINFO? y BSR? y       Holidays? y
 Variables? y     3.0 Enhanced? y
 01 wait-time     1  secs hearing i-silent
 02 adjunct       routing link 7
 03 wait-time     3  secs hearing i-silent
 04 adjunct       routing link 1
 05 wait-time     3  secs hearing i-silent
 06 route-to      number V1            with cov n if unconditionally
 07 stop
 08
 09
 10
 11
 12
```

Number: 653                CALL VECTOR
   Name: Video Queue
Multimedia? n       Attendant Vectoring? n    Meet-me Conf? n            Lock? n
   Basic? y         G3U4 Enhanced? y          ANI/II-Digits? y    ASAI Routing? y
   Prompting? y     G3U4 Adv Route? y         CINFO? y  BSR? y    Holidays? y
   Variables? y     3.0 Enhanced? y 01
02  goto step        14                 if staffed-agents    in skill 1st    < 1
03
04  queue-to         skill  1st  pri  m
05  wait-time        5 secs hearing music
06  announcement     1181202
07  wait-time        60 secs hearing music
08  announcement     1181289
09  wait-time        120 secs hearing music
10  announcement     1181290
11  wait-time        120 secs hearing music
12  goto step        7                  if unconditionally
```

… # METHOD AND SYSTEM FOR PROVIDING ASSISTANCE VIA VIDEO

CROSS-REFERENCE TO RELATED APPLICATIONS

This application claims priority to U.S. Provisional Patent Application No. 60/986,593, filed Nov. 8, 2007, entitled "Method and System for Assistance via Video," and U.S. Provisional Patent Application No. 61/002,653, filed Nov. 8, 2007, entitled "Method and System for Assistance via Video," each of which is herein incorporated by reference in its entirety.

BACKGROUND

When a device, e.g., a cellular telephone, malfunctions, or when its owner believes it is malfunctioning, assistance is required. Presently, the device owner may bring the device to the appropriate vendor for in-person assistance. However, not every vendor provides an in-person technician with the necessary skills at its store. In the alternative, the device owner may transport the device to the appropriate vendor/fix-it location for remote assistance. However, the device owner must cope without the device for an extended period due to, e.g., transportation time. In the alternative, the device owner may telephone the customer service representative for assistance. However, the customer service representative must rely on the device owner's characterization of the device malfunction and sometimes proper diagnosis is not possible.

Accordingly, there exists a need for a remote customer service representative or other person to be able to view and test a device remotely. Many obstacles are inherent in such a plan. For example, modern video-conferencing requires that a caller know the specific dialing extension to establish a video-conferencing session with a known party. However, in the context of customer assistance the called party is unknown and a customer must locate an appropriate customer service representative or other person with sufficient skill to address the malfunction. Once located, the customer service representative must be able to view the device essentially in real-time. However, modern video-conferencing techniques demonstrate the inefficiencies of such communication given the large amount of data due to the video to be transmitted. Accordingly, there exists a further need for a remote viewing and testing of a device in an efficient manner. Further, since a customer may not be sophisticated with respect to the technology, there exists a need for an easy to use system which enables customers to easily locate skilled assistance providers.

SUMMARY

According to an example embodiment of the present invention, a method for providing assistance to a user via video may include: initiating a video chat session as an audio telephone call between a terminal operated by the user and a call host; establishing, by the call host, an audio connection between the user terminal and the call host for the audio telephone call; routing, by the call host, the audio telephone call to a terminal of a human agent, the routing depending on a skill required for providing a type of assistance requested by the user; and the user terminal and the agent terminal establishing a video connection between the user terminal and the agent terminal after the audio telephone call is accepted by the agent terminal.

According to an example embodiment of the present invention, a system for providing assistance to a user via video may include: a call host configured to receive incoming telephone calls; a computing terminal operated by the user and configured to initiate a video chat session as an audio telephone call with the call host; and a plurality of human agent operated terminals in communication with the call host. The call host may be configured to establish an audio connection between the user terminal and the call host for the audio telephone call and route the audio telephone call to a terminal of a human agent, the routing depending on a skill required for providing a type of assistance requested by the user. The agent terminal and the user terminal may be configured such that, responsive to the agent terminal accepting the routed telephone call, the agent terminal and the user terminal establish a video connection between the user terminal and the agent terminal.

According to an example embodiment of the present invention, a computer-readable medium may have stored thereon a series of instructions executable by a processor for providing assistance to a user via video, where the instructions, when executed, cause the processor to perform the steps of: initiating a video chat session as an audio telephone call between a terminal operated by the user and a remote computing device; establishing, by the call host, an audio connection between the user terminal and the remote computing device for the audio telephone call; routing, by the call host, the audio telephone call to a terminal of a human agent, the routing depending on a skill required for providing a type of assistance requested by the user; and the user terminal and the agent terminal establishing a video connection between the user terminal and the agent terminal after the audio telephone call is accepted by the agent terminal.

According to an example embodiment of the present invention, a method and/or system for providing assistance to a user may include: a user terminal directing a chat session telephone call to a call host; the call host selecting an agent terminal from a plurality of agent terminals; the call host routing the telephone call as an audio connection to the selected agent terminal; and responsive to the routing of the telephone call, the user terminal and the selected agent terminal directly negotiating with each other to establish a video connection and/or text chat connection that is maintained in parallel with the audio connection.

According to other example embodiments of the present invention, methods and/or systems may include transmitting waves carrying signals encoded with instructions executable by one or more processors, the instructions, when executed, causing the one or more processors to perform the various example embodiments discussed herein.

BRIEF DESCRIPTION OF THE DRAWINGS

FIG. 11 shows an example call vector according to an embodiment of the present invention.

FIG. 12 shows an example call vector according to an embodiment of the present invention.

FIG. 13 shows an example call vector according to an embodiment of the present invention.

FIG. 14 shows an example call vector according to an embodiment of the present invention.

DETAILED DESCRIPTION OF EXAMPLE EMBODIMENTS

Figure 1:
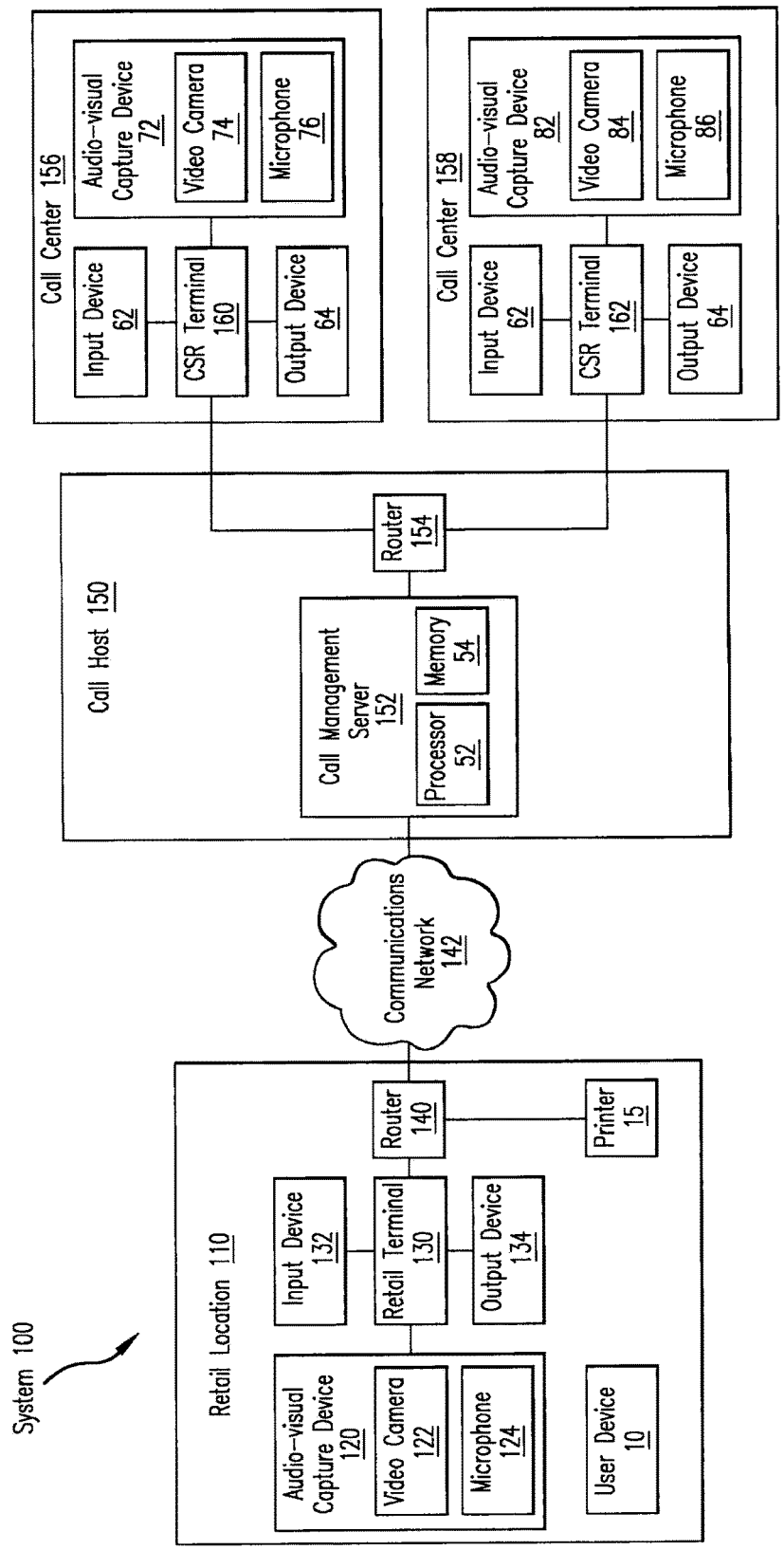
FIG. 1 is a block diagram that shows an example system for providing assistance via video according to an embodiment of the present invention.

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

The present invention relates to methods and systems for providing assistance via video. Exemplary embodiments of the present invention relate to methods and systems for interfacing between at least two entities, e.g., two persons such as a customer and a technical support representative, in which a web-capable video camera focuses on the device needing possible assistance or checking. In a further embodiment, the device is connected via the Internet so that the technical support representative can test the device electronically, if desired. For example, the device may be attached to a cable, docking station, or connect electronically to a system.

In an example embodiment of the present invention, before a voice connection is established, a call-initiating device signals a call server requesting a call setup. Effectively, the telephone or voice capable extension goes off hook and the preconfigured digits indicating appropriate call center treatment are transmitted to the call server. In an example embodiment, the call server receives a transmission of digits, e.g., transmitted using dual-tone multi-frequency (DTMF), and begins processing the intended treatment for the video-conferencing agent or agent group. The call server may search a pool of available agents having video capability and/or other skills/capabilities, may look up, e.g., in a table, a specific calling extension for the available agent, and may ring the agent's telephone or other capable device for audio communication. In an example embodiment, the agent's telephone, for example, is preconfigured to automatically go off-hook to establish a connection with the call server. The call server may then switch the initiating call from the server port to the telephone port on the receiving end (the agent's end) according to preconfigured and/or prearranged capabilities and/or instructions. In an embodiment, upon an audio connection, a video connection is then established. Alternatively, a video connection may be established prior to or close in time to the audio connection establishment. In an embodiment, for example, the establishment of the voice connection/voice endpoints allow the video portion of the call to know to which endpoint to establish a video connection. In an embodiment, the origination call carries a video signaling request information so that a software process(es) on the video endpoints is provided with information for transmitting video data. For example, the device(s) employed capture and convert the video into data.

FIG. 1 shows an example of a system 100 for providing assistance via video according to an example embodiment of the present invention. The system 100 may include a retail location 110. In an example embodiment, the retail location 110 is a mobile device retailer specializing in the sale of mobile devices and related services. Alternative embodiments may include any location through which a user can communicate in the manner of the present invention, as described below. In an embodiment, the retail location 110 includes a retail terminal 130, e.g., a kiosk, in communication with a remote call host 150 via a communications network 142. In an embodiment, the retail location 110 includes an audio-visual (A/V) capture device 120, an input device 132, an output device 134, a router 140, a user device 10, and a printer 15.

In an example embodiment, the router 140 is configured to direct audio and video signals between the retail terminal 130 and the communications network 142. In an example embodiment, the router 140 is a networking device to which multiple computing devices at the retail location 110 are coupled. For example, the router 140 communicatively couples a plurality of computing devices, e.g., sales computers, in addition to communicatively coupling the retail terminal 130.

The communications network 142 may be any telecommunications network capable of transmitting audio and video data. In an example embodiment, the communications network 142 includes the Internet. The communications network 142 may also include any number of additional networks or sub-networks, such as a local area network (LAN), an enterprise level private area network, a wide area network (WAN), etc.

In an example embodiment, the retail terminal 130 includes any computing device configured for telecommunications. In an example embodiment, the retail terminal 130 is a computer dedicated to communicating with the call host 150. In embodiments, the retail terminal 130 may be configured to run multiple software applications on behalf of the user and/or an operator of the retail location 110, e.g., a retailer. In an example embodiment, the retail terminal 130 is in communication with the capture device 120, which may be configured to capture audio and video signals. In an example embodiment, the capture device 120 is a peripheral device wired to a hardware port of the retail terminal 130, e.g., via a universal serial bus (USB), serial, or FireWire port. Alternatively or in addition to, the capture device 120 may be configured for wireless communication with the retail terminal 130, e.g., in accordance with an IEEE 802.1x or a Bluetooth protocol.

In an example embodiment, the capture device 120 includes a video camera 122 and a microphone 124. The capture device 120 may be secured to the retail terminal 130, e.g., using a number of security mechanisms, such as a cable lock, an alarm triggering tag, an attachment device, etc. In an example embodiment, the capture device 120 is formed integrally with a housing of the retail terminal 130 such that the capture device 120 cannot be removed using ordinary physical force without damaging the housing. The video camera 122 may be any video sensing apparatus capable of generating video images, such as a web camera, a digital camera, etc. As described in further detail below, in an embodiment, the video camera 122 is configured to capture videos of the user as well as a device operated by the user, e.g., the user device 10. For example, the video camera 122 includes at least two image sensors, one sensor positioned to generate images of the user, and a second sensor positioned to generate images of the user device 10. The sensors may be adjustable to facilitate positioning. For example, the video camera 122 is configured to capture images of sufficient resolution to enable a viewer to accurately observe graphics that appear on a display of the user device 10 during device operation. For example, the resolution provided may be sufficient to enable observation of any user interface, e.g., a keypad, or hardware port of the user device 10.

In an example embodiment, the user device 10 includes an interface for communicating with the call host 150. For example, the user device 10 may be networked, e.g., wired or wirelessly, to the router 140, or communicatively attached to the retail terminal 130. In this manner, for example, user device data may be transmitted to the call host 150 in lieu of, or in addition to, the video of the user device 10.

The microphone 124 may be any audio sensor capable of sensing the user's voice. In an example embodiment, the microphone 124 is a uni-directional headset worn by the user. Other alternative microphones may also be utilized, including boom-style desk microphones, omni-directional, handheld, and hands-free microphones. For example, the microphone 124 may be configured to reduce the collection of ambient background noise, such as that which is generated in a public environment where multiple persons may be speaking simultaneously or wind is present. For example, the microphone 124 may include hardware or software filters for filtering out noise. For example, the microphone 124 may be biased towards primarily sensing the user's voice, e.g., pointed towards or near the user's mouth. For example, the microphone 124 may be co-located with the video camera 122, e.g., integrated into a single device. Alternatively, the microphone 124 may be separate from the video camera 122, or co-located with another device such as the output device 134, e.g., in the form of a headset.

In an example embodiment, the input device 132 and the output device 134 are each in communication with the retail terminal 130. In an example embodiment, the input device 132 includes a text input device such as a keyboard and/or a touch pad. The retail terminal 130 may be operated using the input device 132 or a combination of input devices, e.g., a keyboard/mouse combination. In an example embodiment, the output device 134 includes one or more output components such as a display, e.g., an LCD monitor, a speaker, or headphones.

The printer 15 may be any printing device such as a laser or inkjet printer. In an example embodiment, the printer 15 is in direct communication with the retail terminal 130, e.g., via a USB connection, or in networked communication, e.g., via the router 140.

The call host 150 may include a call management server 152 and a router 154. In an example embodiment, the server 152 is configured to receive audio and video data through the communications network 142. In an example embodiment, the audio data is received in accordance with a voice-over-IP (VoIP) protocol. For example, the retail terminal 130 may be configured to initiate a communications session by initiating a call from a pre-configured speed dial that associates to a soft extension of the server 152. The speed dial may utilize H.323 signaling and/or audio path protocols to establish a connection with the server 152. The communications session may be a voice chat session including audio, video, and/or text components.

In an example embodiment, the server 152 includes hardware and/or software configured to manage a customer support service on behalf of a client, e.g., the owner of a retail chain by, for example, fielding and routing calls from retail terminals 130. The server 152 may include, e.g., any number of computing devices or subcomponents, such as a video conferencing server and a call hosting server, e.g., a media server. In an example embodiment, the server 152 includes logic configured to allow the server 152 to perform a search for a customer service representative (CSR) having a particular skill required for providing assistance to the user via the video chat session. In an example embodiment, the server 152 includes logic for a pre-configured extension which may allows the server 152 to search for call center agents staffed in a call center which is equipped to handle voice and/or video calls. In an example embodiment, when a call center agent is found available, the server 152 connects the audio path of the retail store (or other location) and the call center. In an example embodiment, when the audio path is established between the retail store (or other location), the video components negotiate a direct video connection between each other through the data network. In an example embodiment, the video captured by the cameras(s) at one, some, or all ends, is encoded into digital packets by hardware and software processes on the video devices.

In an example embodiment, the video conferencing server is configured to support Internet protocol (IP) based transmission of audio and video data between the retail terminal 130 and the call host 150. The video conferencing server may, for example, provide for video streaming in accordance with the H.264 video compression standard published by the ITU Telecommunication Standardization Sector (ITU-T). Alternative examples of suitable video conferencing servers exist, including, e.g., an IP softphone server configured to route calls based on the Session Initiation Protocol (SIP) published by the Internet Engineering Taskforce (IETF).

In an example embodiment, the call hosting server is configured to communicate with one or more call centers 156 and 158 at which CSRs are located. For example, the call hosting server controls the operation of a router 154 at the call host 150, directing calls from the retail terminal 130 to an appropriate call center. In an example embodiment, after a call is received, an audio path may be established between the retail store and the call center. In an example embodiment, if the call is accepted by a CSR, then after establishment of the audio path between the retail store and the call center, a direct video connection between the user terminal and a terminal operated by the CSR is automatically negotiated responsive to the acceptance of the call, e.g., a direct negotiation between the user and CSR terminals, using, for example, H.264 protocols in conjunction with a direct H.323 audio connection provided by the server 152. In this manner, audio and video connections between the two terminals may be established, it being unnecessary for a user of either of the user and selected CSR terminals to directly dial or otherwise connect to the other of the user and selected CSR terminals. The call hosting server may include any number of software tools for monitoring, evaluating, and/or operating a large scale calling system. In an example embodiment, the call hosting server may include the Call Management System (CMS) software from Avaya, Inc, which provides software tools for monitoring and analyzing call center operations.

In an example embodiment, the embodiment of the video conferencing server and the call hosting server may be realized on a single computer, i.e., the call management server 152 as shown in the exemplary embodiment of FIG. 1, rather than as separate computing devices. Accordingly, the functions of the video conferencing server and the call hosting server may be performed by a processor 52 and a memory 54. For example, the memory 54 includes instructions configuring the processor 52 to provide the video conferencing capabilities and software tools previously described. In addition, any number of call management servers operating in parallel to provide video conferencing to a plurality of retail locations may be involved in example embodiments of the present invention.

In an example embodiment, the call centers 156, 158 are located in the same or separate facilities. For example, the call centers 156, 158 may be located in different districts, states, countries, etc., since it is common for large corporations to provide multiple associated call centers in different geographic regions. Reasons for the different locations may include providing for around-the-clock phone support, providing local support, e.g., calling a CSR based in the same time zone as the retail location 110, and/or providing technical support based on different skills or proficiencies, e.g., having call centers that specialize in different technical problems, different language capabilities, different devices, etc.

In an example embodiment, the call centers 156, 158 respectively include CSR terminals 160 and 162, each operated by an entity, e.g., a human agent, the CSR. In an example embodiment, the CSR terminals 160, 162 are computers configured to communicate with the call management server 152 though the router 154. The CSR terminals 160, 162 may each be in communication with an input device 62 and an output device 64. The CSR terminals 160, 162 may also respectively be in communication with audio/video (A/V) capture devices 72 and 82.

In an example embodiment, the input device 62 includes a keyboard, a touchpad, and/or a mouse, etc. Using the input device 62, the CSR engages in the communications session with the user. For example, the CSR inputs text messages intended for the user. For example, the CSR inputs commands for monitoring the communications session (e.g., viewing call statistics) and/or commands for providing technical assistance. For example, the CSR accesses a knowledge database located at the call host 150, e.g., the call management server 152, and research and/or diagnose a technical issue arising as a result of a discussion with the user or viewing and/or testing of the device of the user. In an example embodiment, the CSR updates the knowledge database once the technical issue is resolved, so that future instances of the same technical issue may be linked to a solution and/or an attempt at a solution used during the communications session.

In an example embodiment, the output device 64 includes one or more output components such as a display, e.g., an LCD monitor, a speaker, and/or headphones. The display may be configured to display a video as well as provide a general user interface through which the CSR may interface with the CSR terminal 162. The speaker, or another audio component, may be configured to reproduce sounds sensed by the A/V capture device 120 when the communications session is established.

In an example embodiment, the A/V capture devices 72, 82 are of similar configuration to the A/V capture device 120. For example, the A/V capture devices 72, 82 respectively include video cameras 74 and 84, configured to capture video of the CSR. The A/V capture devices 72, 82 may also respectively include microphones 76, 86. For example, the A/V capture device 72 may be an IP softphone and the A/V capture device 82 may be an H.323 and/or H.264 compatible station. In an embodiment, the A/V capture devices 72, 82 may be of the same type, e.g., both IP softphones, or both H.323 and/or H.264 compatible stations.

Several exemplary embodiments of methods for providing assistance via video according to the present invention are described herein. The methods may be implemented in hardware, software, or a combination thereof, and are described with reference to the example system 100 of FIG. 1. However, the methods may also be successfully implemented in other systems according to the present invention.

Figure 2:
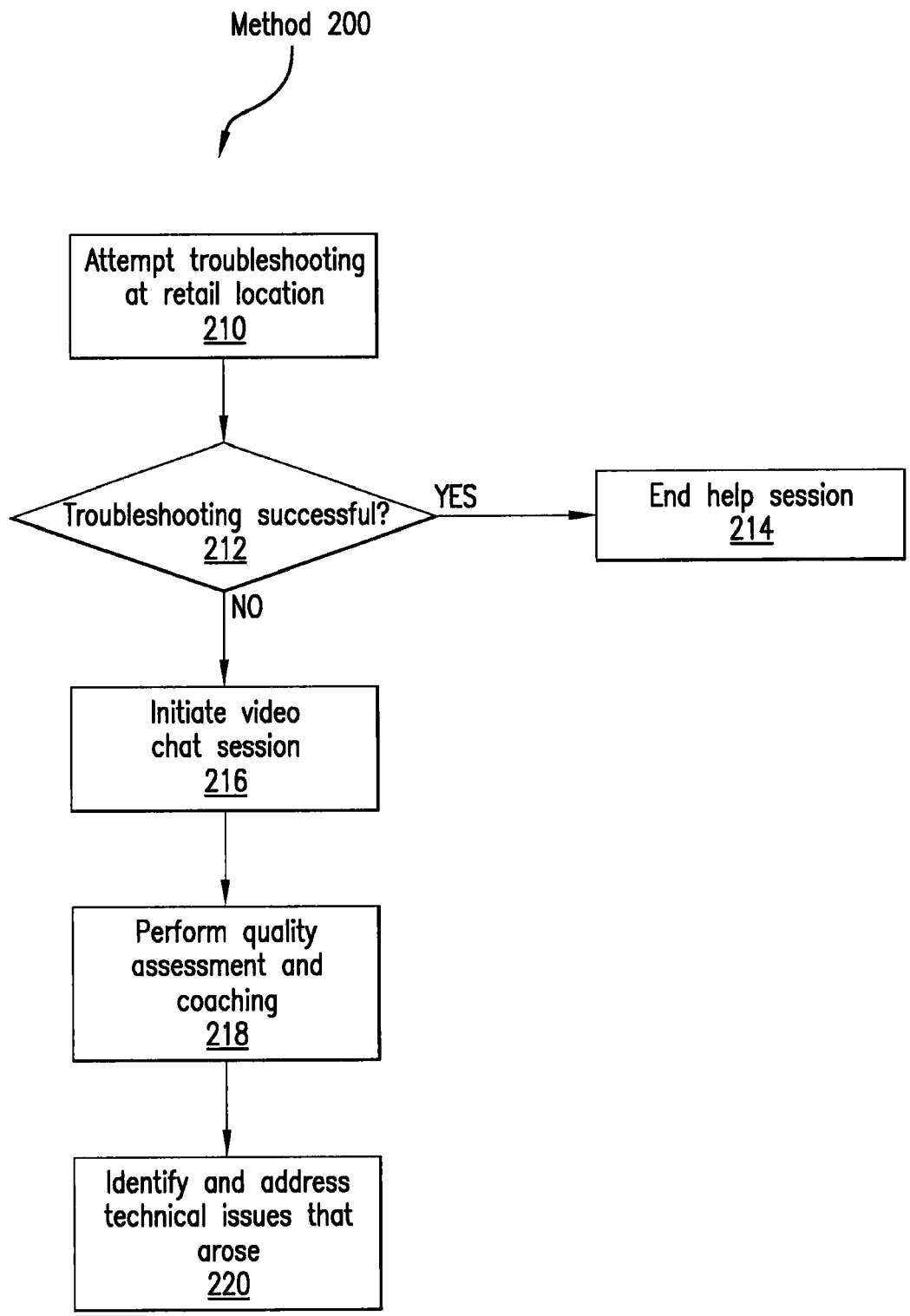
FIG. 2 is a flowchart that shows an example method for providing assistance via video according to an embodiment of the present invention.

FIG. 2 shows an example method 200 for providing assistance via video according to an example embodiment of the present invention. The example method 200 begins at 210, where an entity, e.g., a retailer attempts to troubleshoot an issue related to the user device 10, after the user visits the retail location 110 with the purpose of requesting a help session. The retailer may be experienced in providing support relating to sales, service and billing inquiries, but also may have limited skill in handling technical issues.

In 212, whether the troubleshooting is successful may be determined. The determination may be based on the user's own opinion on whether the issue has been resolved. If the issue has been completely resolved and the user is satisfied with the troubleshooting experience, then the help session is ended in 214.

In 214, the help session may be ended by, for example, asking the user to fill out a customer satisfaction survey and/or other questionnaire and/or asking the user to hit a termination button (e.g., a soft or hard button). A record of the help session may also be generated and stored in electronic format and/or printed, e.g., as a receipt.

Figures 4, 5:
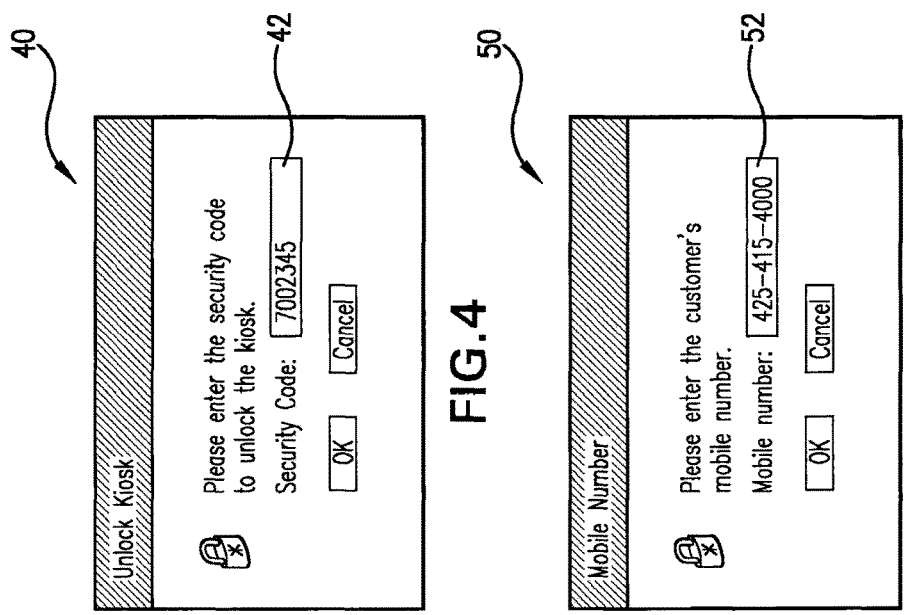
FIG. 4 shows an example of a display prompt according to an embodiment of the present invention.
FIG. 5 shows an example of a display prompt according to an embodiment of the present invention.

If the issue has not been completely resolved, or if the user has further questions which the retailer is unable to answer, then the method proceeds to 216, in which a video chat session is initiated. In an example embodiment, the method involves initiation of the video chat session by only the retailer, so that the user is not able to access the retail terminal 130 without authorization from the retailer. In an example embodiment, any user may access the terminal 130. In an example embodiment, the initiation includes inputting a password into the retail terminal 130. As shown in FIG. 4, a display prompt 40 may be used to enter a security code for unlocking the retail terminal 130, which may default to a locked state, e.g., after boot-up or at the end of each video chat session.

In an example embodiment, initiation of a video chat session involves inputting an identifier corresponding to the user and/or the user device 10. For example, as shown in FIG. 5, a display prompt 50 provides a text entry field for inputting a mobile device number of the user device 10. In an example embodiment, the terminal 130 or other device associated with the terminal 130 validates the mobile device number, after which the chat session may be initiated so that the user may engage in video, text and/or audio communication with the CSR until the issue is resolved. The method 200 then proceeds to 218.

In 218, a quality assessment and coaching procedure is performed. In an example embodiment, quality assessment involves reviewing a transcript and/or recording of the video chat session to determine whether the CSR was helpful in addressing the issue and any questions the user may have had. After assessing the CSR's performance, coaching may be performed to improve the CSR's performance. Coaching may involve instructional materials such as technical lessons, instructional simulations, videos, skills workshops, and/or one-on-one or small group training, etc.

In 220, technical issues are identified and addressed at a global level by, for example, updating the knowledge database to include a record of the video chat session, and/or to include solutions/attempted solutions along with corresponding results. In an example embodiment, technical issues are addressed by identifying a source of the problem, e.g., tracing a software glitch back to a specific software module and/or a hardware component, then attempting to fix the issue(s) by, for example, creating a software patch, revising a manufacturing process, replacing a defective component, and/or implementing a device recall, etc.

Figure 3:
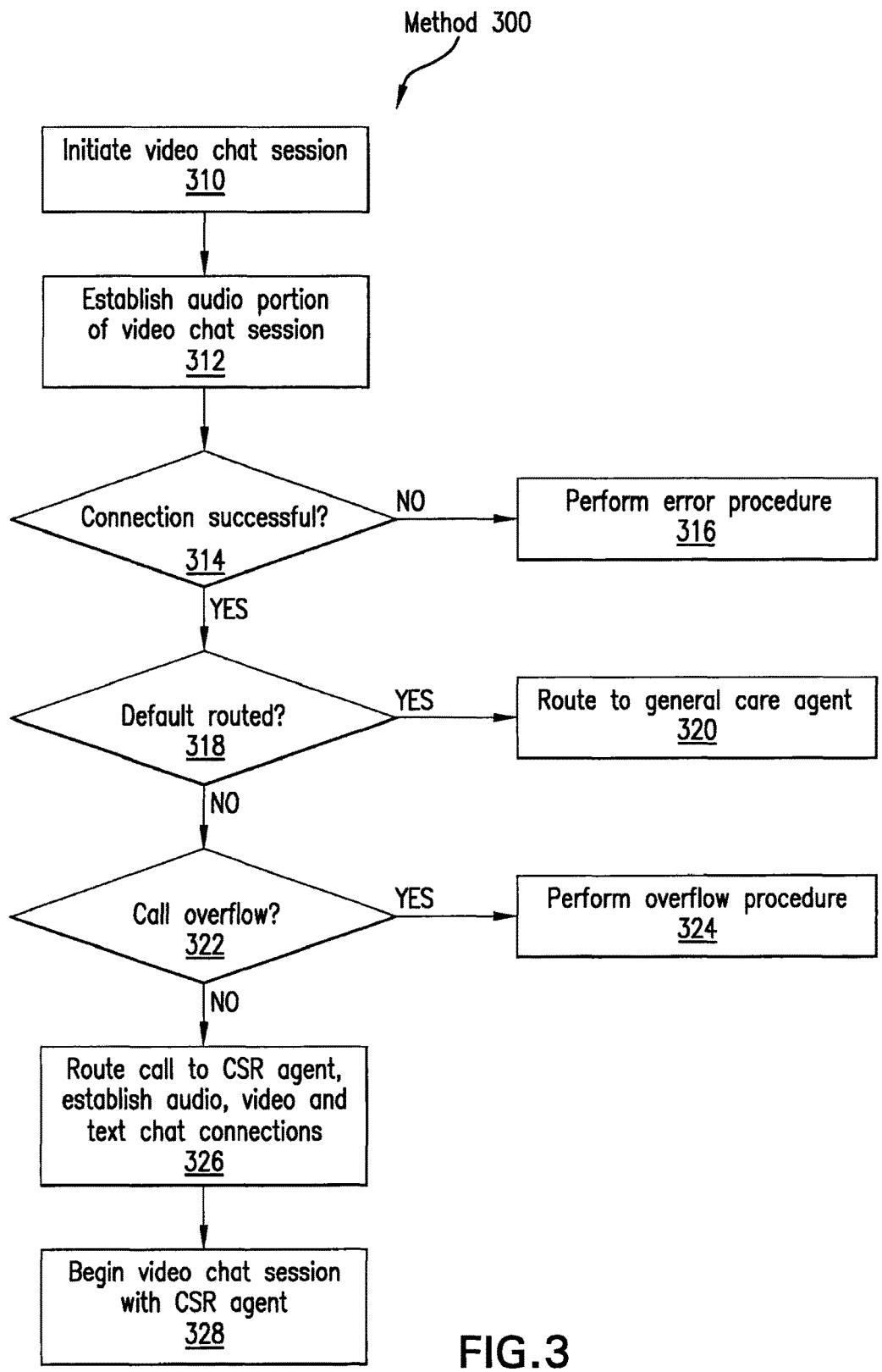
FIG. 3 is a flowchart that shows an example method for providing assistance via video according to an embodiment of the present invention.

FIG. 3 shows an example method 300 for providing assistance via video according to an example embodiment of the present invention. The method 300 describes additional features corresponding to what may occur after the video chat session is initiated in 310. For example, the initiation occurs as previously described with reference to 216 of the method 200. That is, the retailer unlocks the retail terminal 130 and the user's mobile number is inputted. In an example embodiment, the retail terminal 130 is configured to then automatically dial a soft extension of one or more call hosts. Dialing may be performed sequentially until a connection is established to one of the call hosts, e.g., the call host 150 accepts the call, or until a predetermined period of time has elapsed, e.g., connection timeout.

In 312, an audio portion of the video chat session may be established. For example, the call management server 152 establishes an audio connection by opening an audio port at the call host 150, enabling audio data to be transmitted to and from the retail terminal 130. The audio connection may be established in the same manner as an IP-based telephone call. For example, the audio connection is handled as an H.323 based Voice over Internet Protocol (VoIP) call. For example, after the audio connection is established, the call host 150, in accordance with the logic in the server 152, provides the user with an automated menu for selecting among any number of support options, e.g., an option to route the call based on a type of technical issue, an option to direct-dial an extension of a CSR, and/or a default option if none of the other options seem appropriate, etc. The automated menu option selection may be voice activated or, alternatively, input device activated, e.g., dial tone responsive. Ringtones, music on hold, pre-recorded announcements, termination notice or disconnection, and/or other automated menu features may be provided to the user via the audio connection.

In an example embodiment, once two voice endpoints establish a connection, the endpoints negotiate a channel and/or path for the transmission of video through the network, while maintaining, for example, a connection for the audio portion of the session and/or for signaling call instructions such as hold, disconnect, and/or supervision requests, etc.

In an example embodiment, once two voice endpoints establish a connection, the endpoints negotiate a channel and/or path for the transmission of audio and video through the network, while maintaining, for example, a connection to the call server for signaling call instructions such as hold, disconnect, and/or supervision requests, etc.

In 314, whether the audio connection has been successfully established may be determined. A successful connection may be indicated, for example, by the receipt of IP packets at the call management server 152, and/or by the transmission (and successful receipt thereof) of acknowledgement packets by the retail terminal 130.

If the audio connection is unsuccessful, then an error procedure is performed in 316. The error procedure may involve playing an error message to the user, effecting a termination of the connection, effecting a connection to a different location, effecting a hold pattern, generating an entry in an error log, and/or displaying a message intended to alert the retailer and/or user, etc.

If the audio connection is successful, then the method 200 proceeds to 318, in which a determination on whether the call has been default routed may be made. Default routing occurs if, for example, the user selects the default option from the automated menu.

If the call is default routed, then the method 200 proceeds to 320, where the call may be routed to a general care agent (or other location or termination), who may have a general technical expertise, and/or may be able to direct the user to a source of further information, e.g., another CSR.

If the call is not default routed, then the method 200 proceeds to 322, where a determination on whether a call overflow has occurred is made. For example, the server 152 searches a pool of available CSRs staffed in a particular skill and/or having a specific technical capability indicated by the user's previous menu selections. If a CSR with the requisite skill and/or technical capability is available, the server 152 attempts to connect the user to the CSR. Call overflows may occur as a result of unexpectedly high call volumes. For example, if all the CSRs skilled in a particular area selected by the user are busy assisting other users, then the user is not able to connect and a call overflow occurs.

In an example embodiment, if the call overflow occurs, then the method 200 proceeds to 324, in which an overflow procedure is performed. In an example embodiment, the overflow procedure involves placing the call onto a queue and playing or displaying a message to the user indicating that all CSRs are currently busy.

In an example embodiment, if the call overflow does not occur, then the method 200 proceeds to 326, where the call is routed to a CSR selected based on skill and/or capability. For example, the server 152 is configured to look up a specific extension of the CSR to whom the call will be routed. In an example embodiment, the call routing results in a ringing of the CSR's terminal (e.g., the CSR terminal 160 or 162), which may be configured to automatically answer the call, thus establishing an audio connection between the CSR and the server 152. In an example embodiment, the server 152 then connects the user to the CSR by switching the call from the server audio port to an audio port of the CSR terminal, resulting in an establishment of an audio connection between the retail and CSR terminals.

In an example embodiment, in 328, the call host 150 continues to provide for an audio connection between the retail terminal 130 and the CSR terminal after the video chat session has been successfully negotiated. Once the audio connection is established and the terminal 130 and CSR terminal are aware of each other, the retail terminal and the CSR terminal negotiate their own channel and path for transmission of video, establishing a video connection between the retail and CSR terminals. Although the video chat session may be conducted through the computing network substantially independent of any further interaction with the server 152, the audio connections between the server 152 and each of the retail terminal 130 and the CSR terminal may be maintained for signaling of call instructions such as call hold and disconnect supervision requests.

In an example embodiment, the video chat session includes the display of video images in addition to the exchange of text messages between the user and the CSR. For example, the text messages are exchanged over a text connection negotiated between the retail terminal 130 and the CSR terminal in a manner similar to the negotiation of the video channel/path. That is, the retail and CSR terminals may directly negotiate the text connection independent of any involvement by the server 152.

Figure 6:
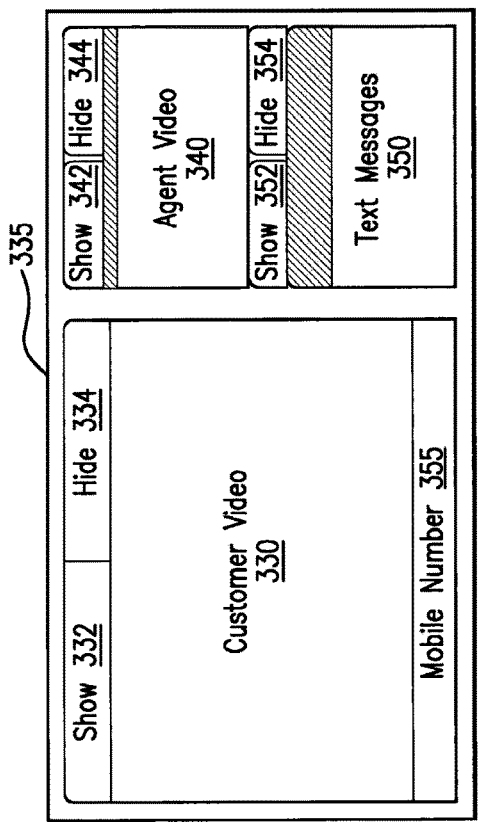
FIG. 6 shows an example of a CSR display according to an embodiment of the present invention.

Referring to FIG. 6, a CSR display screen 335 according to an example embodiment of the present invention includes a window having a customer video frame 330, an agent video frame 340, a text message frame 350, and a mobile number frame 355. Alternatively, one or more components 330/340/350/355 may be separate windows. In an example embodiment, the CSR display screen 335 is displayed at the output device 64 or another display coupled to the CSR terminal 160, e.g., as part of a dual or multi-display configuration. In an example embodiment, the frame 330 is configured to display a video of the user, as recorded by the A/V capture device 120. The frame 330 may be moveable, resized, minimized, docked, and/or otherwise manipulated by the CSR, e.g., as a separate window and/or as a frame within a window shared by the other described frames. For example, the frame 330 includes a show tab 332 and a hide tab 334 for respectively displaying and hiding the display of the user video. In an example embodiment, the user video is displayed to the CSR in an effective real-time or with minimal delay. In an example embodiment, the user video is synched to the audio of the user, e.g., with short, or, e.g., no more than a half-second delay between viewing an image and hearing a corresponding sound.

As discussed above, the user video may include a video of the user device 10, in addition to the user video. For example, the frame 330 is divided into two portions, one for the user video and one for the user device video. The user video and the user device video may be displayed in any number of configurations, e.g., side-by-side, top-to-bottom, split screen, picture-in-picture, etc. In an example embodiment, the CSR remotely operates the capture device 120, e.g., adjusting a tilt, pan, and/or zoom of the video camera 122 to obtain a better view of the user and/or the user device 10.

In an example embodiment, the frame 340 is configured to display a real-time video of the CSR, as recorded by the A/V capture device 72 or 82. The frame 340 may include a show tab 342 and a hide tab 344. In an example embodiment, the frame 340 is initialized to be sized smaller than the frame 330. In an example embodiment, the frame 340 is manipulated, e.g., resized, according to the preferences of the CSR and/or user.

In an example embodiment, the frame 350 is configured to display contents of the text chat. In an example embodiment, the frame 350 is updated whenever a message is sent from either the user of the CSR, resulting in an instant messaging-like chat experience. The frame 350 may include a show tab 352 and/or a hide tab 354.

In an example embodiment, the frame 355 is configured to display the mobile number of the user device 10. In an embodiment, the frame 355 may be configured to display other information relating to the user or the user device 10, such as the user's contact information, the user device's serial or model number, and/or a firmware version number of the firmware currently installed on the user device 10, etc.

Figure 7:
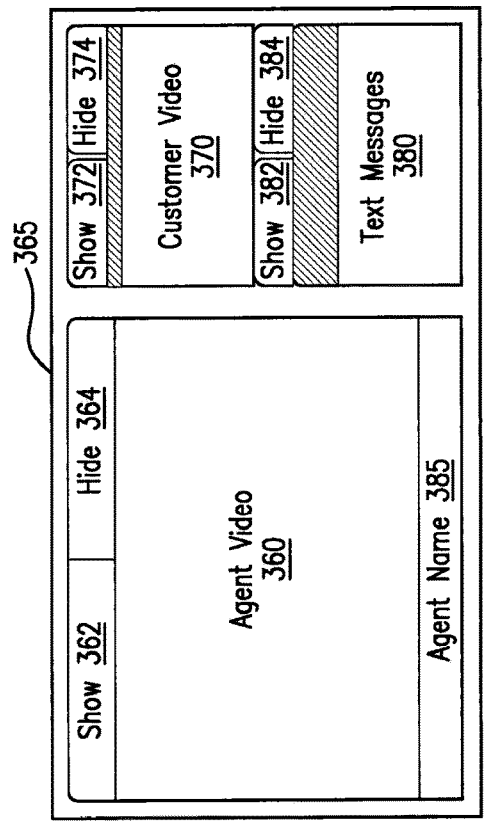
FIG. 7 shows an example of a user display according to an embodiment of the present invention.

FIG. 7 shows an example user display screen 365 according to an example embodiment of the present invention. The user display screen 365 includes a window having an agent video frame 360, a customer video frame 370, a text message frame 380, and an agent name frame 385. Alternatively, one or more components 360/370/380/385 may be separate windows. In an example embodiment, the user display screen 365 is displayed at the output device 134 or another display coupled to the retail terminal 130. In an example embodiment, the frame 360 is configured to display a real-time video of the CSR, as recorded by the A/V capture device 72. The frame 360 may include a show tab 362 and/or a hide tab 364, and may be manipulated by the user or another entity.

In an example embodiment, the frame 370 includes a show tab 372 and a hide tab 374, and may be configured to display the user video to the user. In an example embodiment, the frame 370 is initially sized smaller than the frame 360. However, the frame 370 may be manipulated, e.g., resized, according to the preferences of the user.

In an example embodiment, the frame 380 is configured to display the contents of the text chat, e.g., in an instant message-like fashion. The frame 380 may include a show tab 382 and/or a hide tab 384.

In an example embodiment, the frame 355 is configured to display the CSR's name, e.g., a first name, a last name, or initials. In an example embodiment, the frame 355 is configured to display other information relating to the CSR, such as the CSR's employee number, location, technical skill(s), and/or quality feedback rating, etc.

In an example embodiment, in addition to audio, video, and text, the CSR transmits materials for printing at the printer 15. The materials may be instructional materials, such as a product manual, diagrams, and/or instructional text, etc. The materials may also include other information which the CSR wishes to convey to the user, such as pre-written documents, standard form responses, and/or text that may be too lengthy to type into a text message, etc. In an example embodiment, the materials are transmitted directly to the printer 15. Alternatively, the materials may be transmitted to the retail terminal 130 and printed at the request of the user or another entity.

Figure 8:
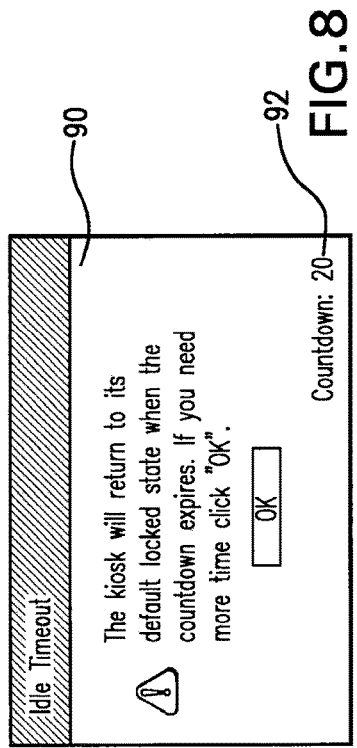
FIG. 8 shows an example of a display prompt according to an embodiment of the present invention.

FIG. 8 shows an example display prompt 90 according to an example embodiment of the present invention. During the course of the video chat session, the retail terminal 130 may experience a period of inactivity. The inactivity may be due to, for example, the user deciding to leave the retail terminal 130, e.g., to take a break or to abandon the video chat session. The inactivity may also be due to the user waiting for a response from the CSR, listening to or watching the CSR's response, etc. Therefore, in an example embodiment, a display of a prompt 90 at the retail terminal 130 is made in order to determine whether the user wishes to continue the video chat session. In an example embodiment, if a predetermined time period 92 has elapsed without a user response, then the retail terminal 130 returns to its initial locked state.

Figure 9:
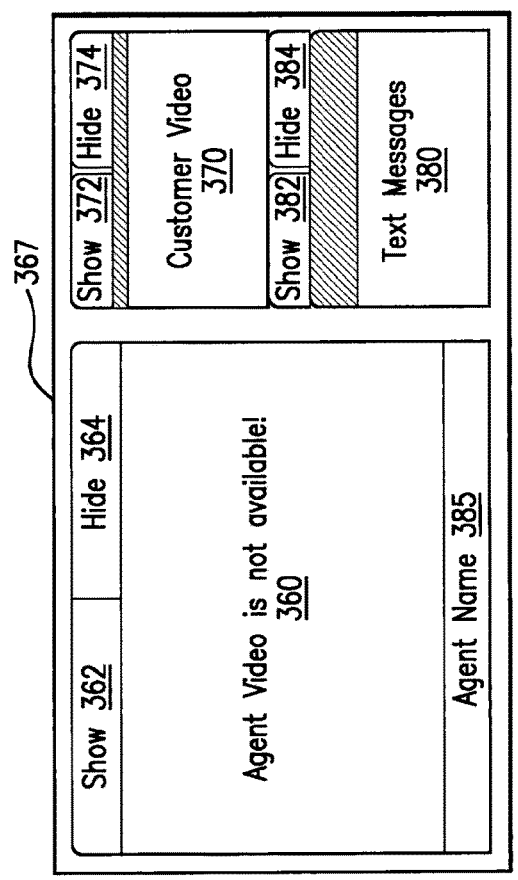
FIG. 9 shows an example of a user display according to an embodiment of the present invention.

FIG. 9 shows an example of a user display screen 367 according to an example embodiment of the present invention. In an example embodiment, the user display screen 367 includes the agent video frame 360, the customer video frame 370, the text message frame, and the agent name frame 385. In an example embodiment, the agent video frame 360 is configured to display a message indicating that the agent video is not available. In an example embodiment, unavailability of the agent video may be the result of the CSR choosing to disable the CSR video. The CSR may also choose to disable audio or text messaging so that the CSR can hear the user, but not vice versa. Therefore, in some instances, the user may be limited to listening to and/or text messaging, the CSR.

Figure 10:
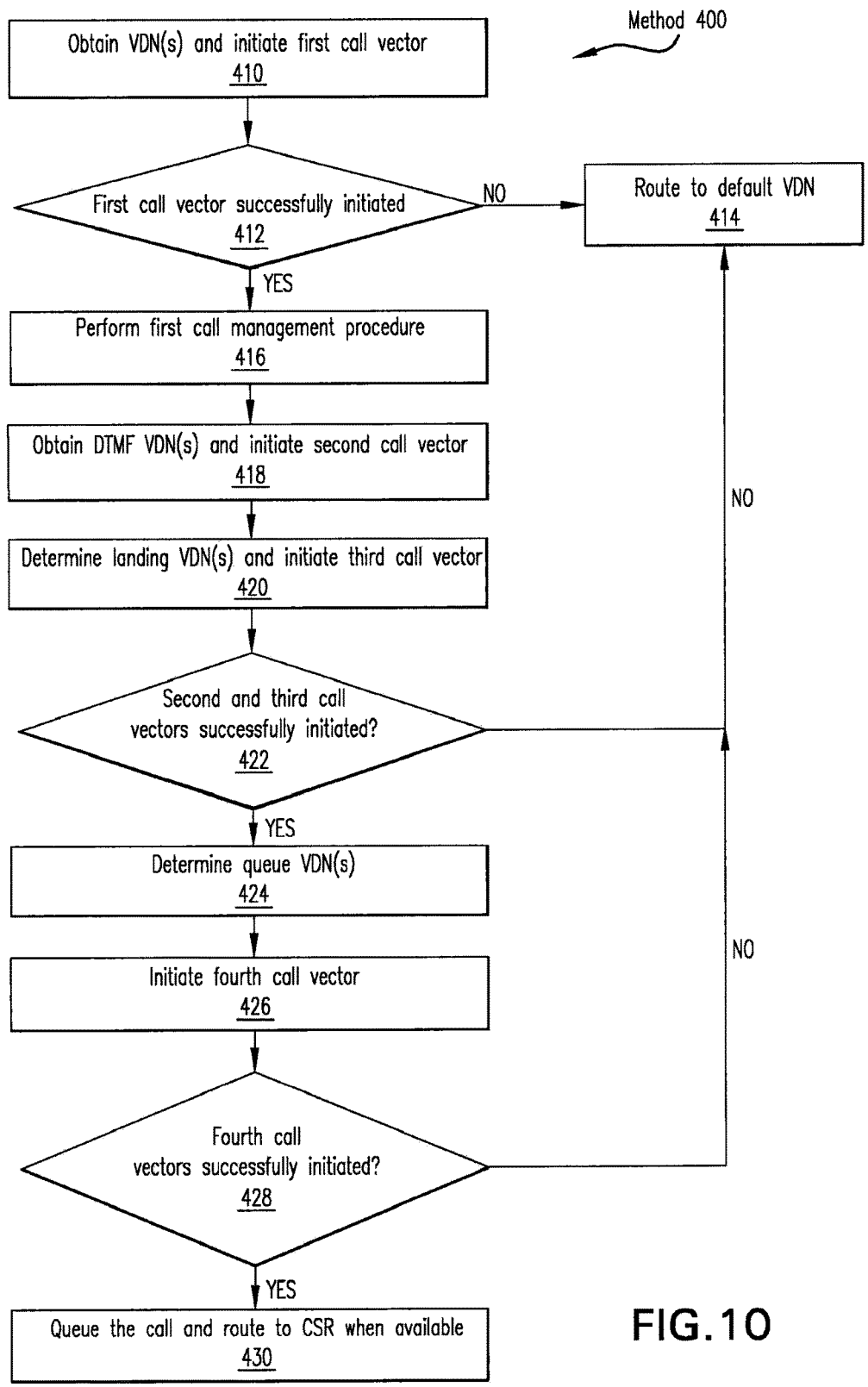
FIG. 10 is a flowchart that shows an example method for providing assistance via video according to an embodiment of the present invention.

FIG. 10 shows an example method 400 according to an example embodiment of the present invention. The method 400 describes a procedure for routing the call after the audio connection is established in 312 of the method 300. In an example embodiment, calls are routed using voice system objects, e.g., call vectors, as defined according to Avaya's CMS. In an example embodiment, each call vector includes a call script for handling a call, including presenting ring tones, busy signals, announcements, and routing to an intermediate destination (e.g., another call center) or a final landing destination (e.g., a CSR). Example embodiments may feature routing without the use of voice system objects, depending on a particular implementation of the call host 150.

In an example embodiment, in 410, a set of vector directory numbers (VDNs) are obtained from storage, e.g., from a list of VDNs stored locally at the call host 150, and a first call vector is initiated. For example, each VDN obtained in this manner is a soft extension corresponding to a call center, e.g., the call center 156, or any other intermediate location having routing logic for establishing a call between endpoints. In an example embodiment, each VDN identifies a call vector, e.g., one of up to 2000 potential vectors. This may enable each retail terminal in a plurality of retail locations to dial into a unique VDN, while providing for identical call treatment at each location/terminal. Further, this can allow for specific call reporting, call logging, and tracing for each location.

Referring to FIG. 11, in an example embodiment, a first call vector 650 includes call configuration parameters. In an example embodiment, the vector 650 includes one or more lines of code or pseudo-code which correspond to a call script executed when the vector 650 is initiated. As seen in FIG. 11, a call script according to the example embodiment of the vector 650 is configured to route to one of several potential call centers (links) that have CSRs with the requisite skill. If a first call center is unavailable, the user may experience a brief wait time before routing to another call center is attempted.

In 412, in an example embodiment, whether the first call vector was successfully initiated may be determined. For example, if the call script was executed without any error conditions, then the initiation may be considered successful. An unsuccessful initiation may indicate that the there are no call centers currently staffed with CSRs of the requisite skill and/or that all the call centers to which routing was attempted in 410 are unresponsive. If the initiation is unsuccessful, then the method 400 proceeds to 414. Alternatively, if the initiation is successful, but a first call center's skilled CSRs are all busy, then the call may be routed to a second call center with available skilled CSRs by proceeding to 416.

In 414, in an example embodiment, the call is routed to a default VDN, e.g., corresponding to a general care agent.

In 416, in an example embodiment, a set of dual-tone multi-frequency (DTMF) VDNs is obtained from storage and a second call vector may be initiated. In an example embodiment, the DTMF VDN(s) corresponds to another intermediate location, e.g., the second call center when the first call center is unresponsive. In an example embodiment, the first call vector 650 is configured to route the call to a VDN selected from among the DTMF VDN(s). In an example embodiment, this does not occur, however, if the first call center is responsive. Referring to FIG. 12, in an example embodiment, a second call vector 651 includes call configuration parameters and a call script configured to route the call to the selected DTMF VDN.

In 418, in an example embodiment, a set of landing VDNs is determined and a third call vector may be initiated. In an example embodiment, each landing VDN corresponds to a potential call destination to which the call is routed as a result of the user selection, e.g., each landing VDN corresponds to a terminal of a CSR with the requisite skill and/or capability, located at the call center corresponding to the selected DTMF VDN. Referring to FIG. 13, in an example embodiment, a third call vector 652 includes call configuration parameters and a call script configured to attempt routing of the call to a VDN selected from among the set of landing VDNs. If a first landing VDN is unresponsive, then the user may experience a brief wait time before routing to another landing VDN is attempted.

In 420, in an example embodiment, whether the second and third call vectors were successfully initiated is determined. If either of the second and the third call vectors were unsuccessfully initiated, e.g., if all call centers and/or all landing VDNs are unresponsive, then the method proceeds to 414 (default routing).

In 422, in an example embodiment, a set of queue VDNs is determined. Each queue VDN may correspond to a waiting queue associated with a landing VDN that responded in 418.

In 424, in an example embodiment, a fourth call vector is initiated. As shown in FIG. 14, a fourth call vector 653 includes call configuration parameters and a call script configured to queue the call onto one or more of the queue VDNs selected depending, e.g., on an estimated wait time of each queue. If the call is not immediately accepted by a CSR terminal associated with one of the queue VDNs, the call script is, for example, configured to present a busy signal, e.g., music followed by an announcement, to the user. As shown in FIG. 14, a time duration between announcements may gradually increase while the user is waiting.

In 426, in an example embodiment, a determination is made whether the fourth call vector 653 has been successfully initiated, e.g., based on whether the selected queue VDN(s) have timed out, e.g., whether the user has waited too long without the call being accepted by a CSR. If the selected queue VDN(s) time out, then the fourth call vector 653 has not been successfully initiated and the call may be default routed, and/or or routed to a related skill and/or capability (414).

In 428, in an example embodiment, an indication that the call is accepted by a CSR is received. CSR terminal(s) may be configured to automatically accept the call if the CSR is available. In an example embodiment, the call is taken off any pending queues and control over the call may then be transferred to the CSR, at which point the video connection can be negotiated depending on whether the CSR's terminal is video enabled. In an example embodiment, the CSR then, at the CSR's own discretion, may choose to engage in video, audio, or text communications with the user. Alternatively, the CSR may transfer the call, e.g., to another queue, extension, or external phone number. The CSR may initiate a conference call with another party.

In the preceding specification, the present invention has been described with reference to specific example embodiments thereof. It will, however, be evident that various modifications and changes may be made thereunto without departing from the broader spirit and scope of the present invention as set forth in the claims that follow. The embodiments described herein may be combined with each other in various combinations. The specification and drawings are to be regarded in an illustrative rather than restrictive sense.

What is claimed is:

1. A method for providing assistance related to a consumer device to a user via video, comprising:
    initiating a video chat session as an audio telephone call between a user terminal operated by the user and a call host, the user terminal connected to a video camera that includes a first image sensor and a second image sensor; establishing, by the call host, an audio connection between the user terminal and the call host for the audio telephone call;
    routing, by the call host, the audio telephone call to a first agent terminal of a first human agent with a first vector directory number (VDN), the routing depending on a skill required for providing a type of assistance of the consumer device requested by the user; and
    the user terminal and the first agent terminal establishing a video connection between the user terminal and the first agent terminal after the audio telephone call is accepted by the first agent terminal; wherein the video connection is maintained in parallel with an audio connection between the user terminal and the first agent terminal;
    wherein after the audio and video connections are established, providing the assistance to the user terminal, including real-time technical support related to the consumer device operated by the user such that the video connection transmits a real-time view of the consumer device that is captured by the first image sensor of the video camera along with a real-time view of the user that is captured by the second image sensor of the video camera; wherein, if the first VDN is non-responsive, the audio telephone call is routed to at least a second VDN and a third VDN; and
    wherein, if the first VDN, second VDN, and third VDN are all non-responsive, the audio telephone call is routed to a default VDN associated with a general care agent.

2. The method of claim 1, further comprising transmitting a video of the consumer device for display to the first agent.

3. The method of claim 1, further comprising providing a text chat connection between the user terminal and the first agent terminal in conjunction with the video connection.

4. The method of claim 1, further comprising transmitting a real-time video of the first agent for display at the user terminal.

5. The method of claim 4, wherein the real-time agent video is also displayed to the first agent.

6. The method of claim 1, further comprising transmitting a real-time video of the user for display to the first agent.

7. The method of claim 6, wherein the real-time user video is also displayed to the user.

8. The method of claim 1, wherein the initiation of the video chat session is contingent upon the user terminal being unlocked by an administrator of the user terminal.

9. The method of claim 1, further comprising terminating the video chat session after a predetermined period of user inactivity.

10. A system for providing assistance related to a consumer device to a user via video, comprising:
    a call host configured to receive incoming telephone calls;
    a user terminal operated by the user and configured to initiate a video chat session as an audio telephone call with the call host, the user terminal connected to a video camera that includes a first image sensor and a second image sensor; and
    a plurality of human agent operated terminals in communication with the call host;
    wherein: the call host is configured to establish an audio connection between the user terminal and the call host for the audio telephone call and route the audio telephone call to a first agent terminal of a first human agent using a first vector directory number (VDN), the routing depending on a skill required for providing a type of assistance of the consumer device requested by the user; and responsive to the first agent terminal accepting the routed telephone call, the first agent terminal and the user terminal are configured to establish a video connection between the user terminal and the first agent terminal, wherein the video connection is maintained in parallel with an audio connection between the user terminal and the first agent terminal;
    wherein after the audio and video connections are established, providing the assistance to the user terminal, including real-time technical support related to the consumer device operated by the user such that the video connection transmits a real-time view of the consumer device that is captured by the first image sensor of the video camera along with a real-time view of the user that is captured by the second image sensor of the video camera; wherein, if the first VDN is non-responsive, the audio telephone call is routed to at least a second VDN and a third VDN; and
    wherein, if the first VDN, second VDN, and third VDN are all non-responsive, the audio telephone call is routed to a default VDN associated with a general care agent.

11. The system of claim 10, further comprising an audio-visual capture device in communication with the user terminal, the audio-visual capture device configured to capture a video of at least one of the user and a device operated by the user for transmission as part of the chat session.

12. The system of claim 10, wherein the user terminal is configured to transmit a video of the consumer device for display at the first agent terminal.

13. The system of claim 10, wherein a text chat connection is established between the user terminal and the first agent terminal in conjunction with the video connection.

14. The system of claim 10, wherein the first agent terminal is configured to transmit a real-time video of the agent for display at the user terminal.

15. The system of claim 14, wherein the first agent terminal is configured to display the real-time agent video.

16. The system of claim 10, wherein the user terminal is configured to transmit a real-time video of the user for display at the first agent terminal.

17. The system of claim 16, wherein the user terminal is configured to display the real-time user video at the user terminal.

18. The system of claim 10, wherein the video chat session is initiated contingent upon the user terminal being unlocked by an administrator of the user terminal.

19. The system of claim 10, wherein the call host is configured to terminate the video chat session after a predetermined period of user inactivity.

20. A non-transitory computer-readable medium having stored thereon a series of instructions executable by a processor for providing assistance related to a consumer device to a user via video, the instructions configured to cause the processor to perform the steps of: initiating a video chat session as an audio telephone call between a user terminal operated by the user and a remote computing device, the audio telephone call providing the user with access to an automated menu for selecting a technical issue that the user is experiencing with a consumer device; establishing, by a call host, an audio connection between the user terminal and the remote computing device for the audio telephone call;
 routing, by the call host, the audio telephone call to a second agent terminal of a second human agent with a related skill using a second vector directory number in response to determining that a first human agent having specific skill with the technical issue has not accepted the audio telephone call at a first VDN within a particular wait time; and
 the user terminal and the second agent terminal establishing a video connection between the user terminal and the second agent terminal if the audio telephone call is accepted by the second agent terminal; wherein the video connection is maintained in parallel with the audio connection between the user terminal and the second agent terminal, and wherein after the audio and video connections are established, providing the assistance to the user terminal, including real-time technical support related to the consumer device operated by the user such that the video connection transmits a real-time view of the consumer device; wherein, if the first VDN is non-responsive, the audio telephone call is routed to at least a second VDN and a third VDN; and
 wherein, if the first VDN, second VDN, and third VDN are all non-responsive, the audio telephone call is routed to a default VDN associated with a general care agent.

21. The method of claim 1, wherein the human agent accesses a knowledge database located at the call host, such that the human agent at least one of researches or diagnoses a technical issue.

22. The method of claim 21, wherein a call management server of the call host is updated with the research and/or diagnosis of the technical issue by the first agent.

23. The method of claim 1, wherein at least one of the first image sensor or the second image sensor is adjustable such that the video captures images of sufficient resolution to enable the first agent to observe graphics appearing on a display of the consumer device.

24. The system of claim 10, wherein the human agent accesses a knowledge database located at the call host, such that the agent at least one of researches or diagnoses a technical issue.

25. The system of claim 24, wherein a call management server of the call host is updated with the research and/or diagnosis of the technical issue by the first agent.

26. The system of claim 10, wherein at least one of the first image sensor or the second image sensor is adjustable such that the video captures images of sufficient resolution to enable the agent to observe graphics appearing on a display of the consumer device.

27. The method of claim 1, wherein the consumer device is connectable to the user terminal such that the call host receives consumer device data.

28. The method of claim 1, wherein the video chat session is initialized only by the call host such that the user operating the terminal is required to receive authorization.

29. The method of claim 1, further comprising prior to initialization of the video chat session, the user operating the user terminal unlocks the terminal.

30. The method of claim 1, wherein unlocking the user terminal includes at least one of inputting a security code and entering in a telephone number associated with the consumer device.

31. A method for providing assistance related to a consumer device to a user via video, comprising: initiating a video chat session as an audio telephone call between a terminal operated by the user and a call host, the audio telephone call providing the user with access to an automated menu for selecting a technical issue that the user is experiencing with a consumer device; establishing, by the call host, an audio connection between the user terminal and the call host for the audio telephone call; routing, by the call host, the audio telephone call to a second agent terminal of a second human agent with a related skill using a second vector directory number in response to determining that a first human agent having specific skill with the technical issue has not accepted the audio telephone call at a first VDN within a particular wait time; and the user terminal and the second agent terminal establishing a video connection between the user terminal and the second agent terminal if the audio telephone call is accepted by the second agent terminal;
 wherein the video connection is maintained in parallel with an audio connection between the user terminal and the agent terminal; wherein after the audio and video connections are established, providing the assistance to the user terminal, including real-time technical support related to the consumer device operated by the user such that the video connection transmits a real-time view of the consumer device; and wherein the assistance to the user terminal further includes testing, via a communication network, the consumer device; wherein, if the first VDN is non-responsive, the audio telephone call is routed to at least a second VDN and a third VDN; and wherein, if the first VDN, second VDN, and third VDN are all non-responsive, the audio telephone call is routed to a default VDN associated with a general care agent.

32. The method of claim 1, wherein the assistance to the user terminal includes testing, via a communication network, the consumer device.

33. The system of claim 10, wherein the assistance to the user terminal includes testing, via a communication network, the consumer device.

* * * * *